United States Patent
Karim et al.

(10) Patent No.: US 10,249,164 B1
(45) Date of Patent: Apr. 2, 2019

(54) SYSTEMS AND METHODS FOR REDUCING A RISK OF FLICKER VERTIGO CAUSED BY NOTIFICATION APPLIANCES IN SECURITY AND FIRE ALARM SYSTEMS

(71) Applicant: Honeywell International Inc., Morristown, NJ (US)

(72) Inventors: Zia Karim, Saint Charles, IL (US); Fred Merkle, Chicago, IL (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/873,393

(22) Filed: Jan. 17, 2018

(51) Int. Cl.
  *G08B 21/02* (2006.01)
  *G08B 5/38* (2006.01)
  *G01J 1/42* (2006.01)

(52) U.S. Cl.
  CPC ........ *G08B 21/0236* (2013.01); *G01J 1/4204* (2013.01); *G08B 5/38* (2013.01)

(58) Field of Classification Search
  CPC ...... G08B 21/0236; G08B 5/38; G01J 1/4204
  See application file for complete search history.

(56) References Cited

U.S. PATENT DOCUMENTS

| | | | |
|---|---|---|---|
| 6,426,697 B1 * | 7/2002 | Capowski | G08B 3/10 340/3.1 |
| 8,836,532 B2 | 9/2014 | Fish, Jr. et al. | |
| 9,466,186 B2 | 10/2016 | Savage, Jr. | |
| 9,474,128 B2 | 10/2016 | Hoang | |
| 2011/0012746 A1 * | 1/2011 | Fish, Jr. | G08B 5/38 340/691.6 |
| 2014/0333450 A1 * | 11/2014 | Savage, Jr. | G08B 5/38 340/815.45 |
| 2014/0340215 A1 * | 11/2014 | Piccolo, III | G08B 29/12 340/514 |

FOREIGN PATENT DOCUMENTS

WO   WO 2016/135373 A1   9/2016

OTHER PUBLICATIONS

BenQ EW2775ZH Eye-care monitor, accessed electronically on Sep. 1, 2017, http://ap.benq.com/product/monitor/ew2775zh/features/.

* cited by examiner

*Primary Examiner* — Brian Wilson
(74) *Attorney, Agent, or Firm* — Brooks, Cameron & Huebsch, PLLC

(57) ABSTRACT

Systems and methods for reducing a risk of vertigo flicker caused by a notification appliance are provided. Some systems can include the notification appliance measuring an ambient light level, the notification appliance determining whether the ambient light level is lower than a threshold, the notification appliance activating a constant light source responsive to determining that the ambient light level is lower than the threshold, and the notification appliance activating a flashing light source after activating the constant light source.

20 Claims, 2 Drawing Sheets

SYSTEMS AND METHODS FOR REDUCING A RISK OF FLICKER VERTIGO CAUSED BY NOTIFICATION APPLIANCES IN SECURITY AND FIRE ALARM SYSTEMS

FIELD

The present invention relates generally to notification appliances. More particularly, the present invention relates to visual notification appliances, such as strobe light devices.

BACKGROUND

Security systems are known to detect threats within a secured area, and such threats include events that represent a risk to human safety or a risk to assets.

Security systems typically include one or more security sensors that detect the threats within the secured area. For example, smoke, motion, and/or intrusion sensors are distributed throughout the secured area in order to detect the threats. Furthermore, security systems typically include notification appliances, such as sounders and strobe lights.

In low ambient light conditions, a low-frequency, high-intensity, flashing or flickering light source, such a strobe light, can cause humans to experience an imbalance in brain cell activity called flicker vertigo, flicker illness, or the Bucha Effect. The symptoms of flicker vertigo include disorientation, nausea, muscle rigidity, uncontrollable fine motor functions, and seizure.

As such, there is a need for notification appliances that reduce a risk of flicker vertigo.

DETAILED DESCRIPTION

Figure 1:
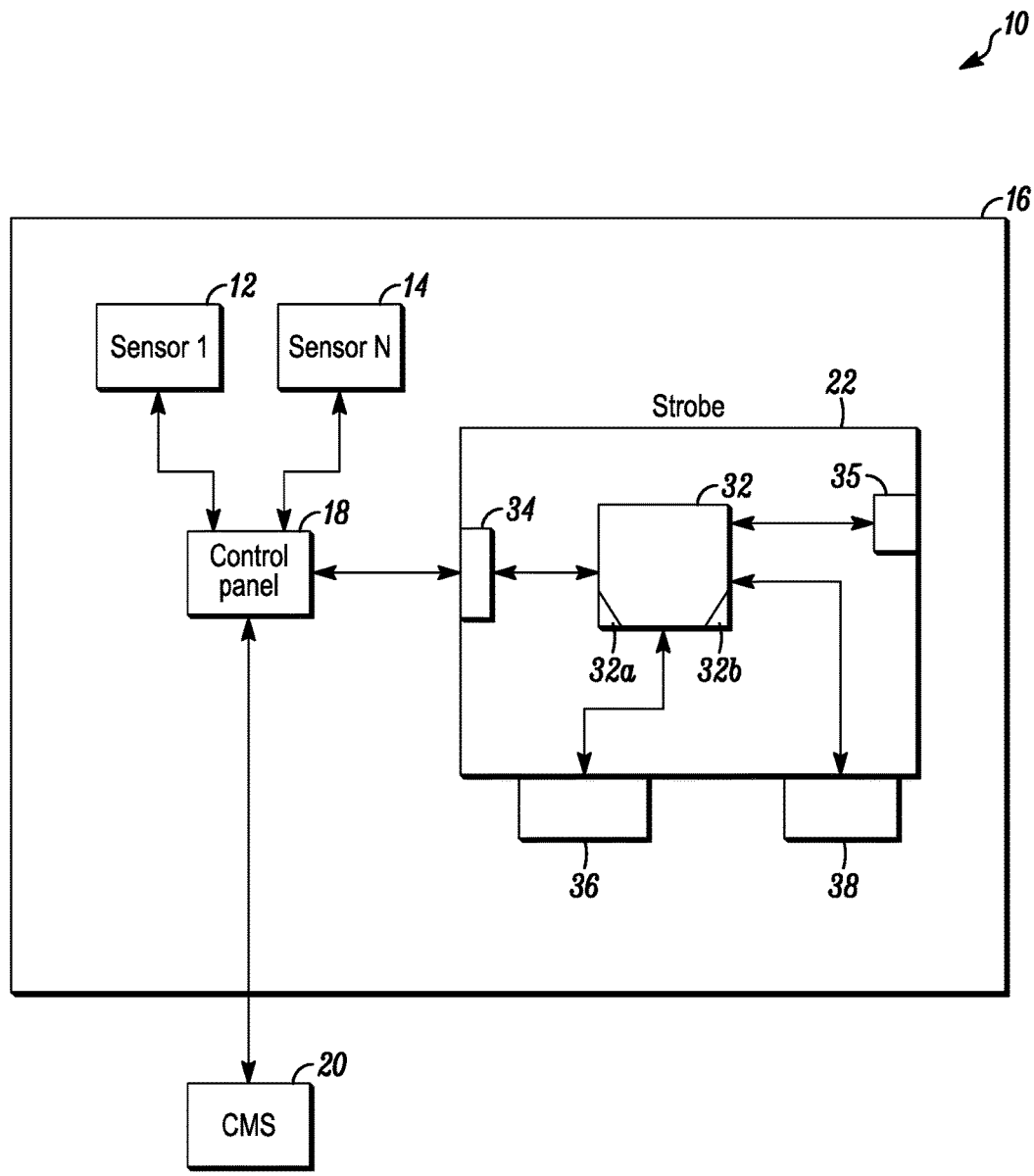
FIG. 1 is a block diagram of a system in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for reducing a risk of flicker vertigo caused by a notification appliance in a security or fire alarm system, such as a strobe light, a flasher, and other flashing or flickering notification appliance. In some embodiments, systems and methods disclosed herein can detect a low ambient light condition and, responsive thereto, activate a constant light source to brighten an area surrounding the notification appliance. For example, the constant light source can brighten the area surrounding the notification appliance while the notification appliance flashes or flickers during an alarm condition, thereby avoiding the notification appliance flashing or flickering in the low ambient light condition.

FIG. 1 is a block diagram of a security system 10 in accordance with disclosed embodiments. As seen in FIG. 1, the security system 10 can include one or more wireless security sensors 12, 14 that monitor a secured area 16 for threats, and in some embodiments, the wireless security sensors 12, 14 can include intrusion, camera, motion, fire, smoke, and gas detectors. The wireless security sensors 12, 14 can communicate with a control panel 18, and the control panel 18 can monitor for activation of the wireless security sensors 12, 14.

In some embodiments, the control panel 18 may send an alarm message to a central monitoring station 20 upon the activation of one of the wireless security sensors 12, 14. The central monitoring station 20 may respond by summoning the appropriate help. For example, if the one of the wireless security sensors 12, 14 detects a fire, then the central monitoring station 20 may summon a local fire department. Alternatively, if the one of the wireless security sensors 12, 14 detects an intrusion, then the central monitoring station 20 may summon the police.

In addition to sending the alarm message to the central monitoring station 20, the control panel 18 can send an activation message to an alarm notification appliance 22 located within the secured area 16. Responsive to the activation message, the alarm notification appliance 22 can emit noise or light to inform occupants of the secured area 16 of an emergency situation.

The alarm notification appliance 22 can include control circuitry 32, which can include one or more programmable processors 32a and executable control software 32b as would be understood by one of ordinary skill in the art. The executable control software 32b can be stored on a transitory or non-transitory computer readable medium, including, but not limited to local computer memory, RAM, optical storage media, magnetic storage media, and the like. In some embodiments, the control circuitry 32, the programmable processor 32a, and the control software 32b can execute and control some of the methods disclosed herein.

The alarm notification appliance 22 can also include a transceiver 34, an ambient light sensor 35, a constant light source 36, and a flashing light source 38. In some embodiments, the transceiver 34 can receive data (e.g. the activation message) from the control panel 18 and relay the data to the control circuitry 32. Substantially simultaneously or responsive thereto, the ambient light sensor 35 can detect light in a region surrounding the alarm notification appliance 22, identify an ambient light level, and relay the ambient light level to the control circuitry 32. For example, in some embodiments, the ambient light sensor 35 can transmit a signal to the control circuitry 32 indicating that the ambient light level is lower than a threshold, thereby indicating a low ambient light condition.

In some embodiments, the flashing light source 38 can flash or flicker, and in some embodiments, the constant light source 36 can emit a constant illumination to increase the ambient light level and compensate for the low ambient light condition. Furthermore, in some embodiments, the constant light source 36 can include a light emitting diode (LED) that does not flicker or flash, and in some embodiments, the constant light source 36 can be located within the notification appliance 22 or integrated into a mounting plate on which the notification appliance 22 can be mounted. In any embodiment, the flashing light source 38 and the constant light source 36 can be activated responsive to signals from the control circuitry 32, and in some embodiments, a brightness level of the constant light source 36 may depend on the ambient light level. For example, the constant light source 36 may emit a brighter light when the ambient light level is very low, and in some embodiments, the brightness level of the constant light source 36 may be controlled by controlling an amount of current provided to the constant light source 36.

Figure 2:
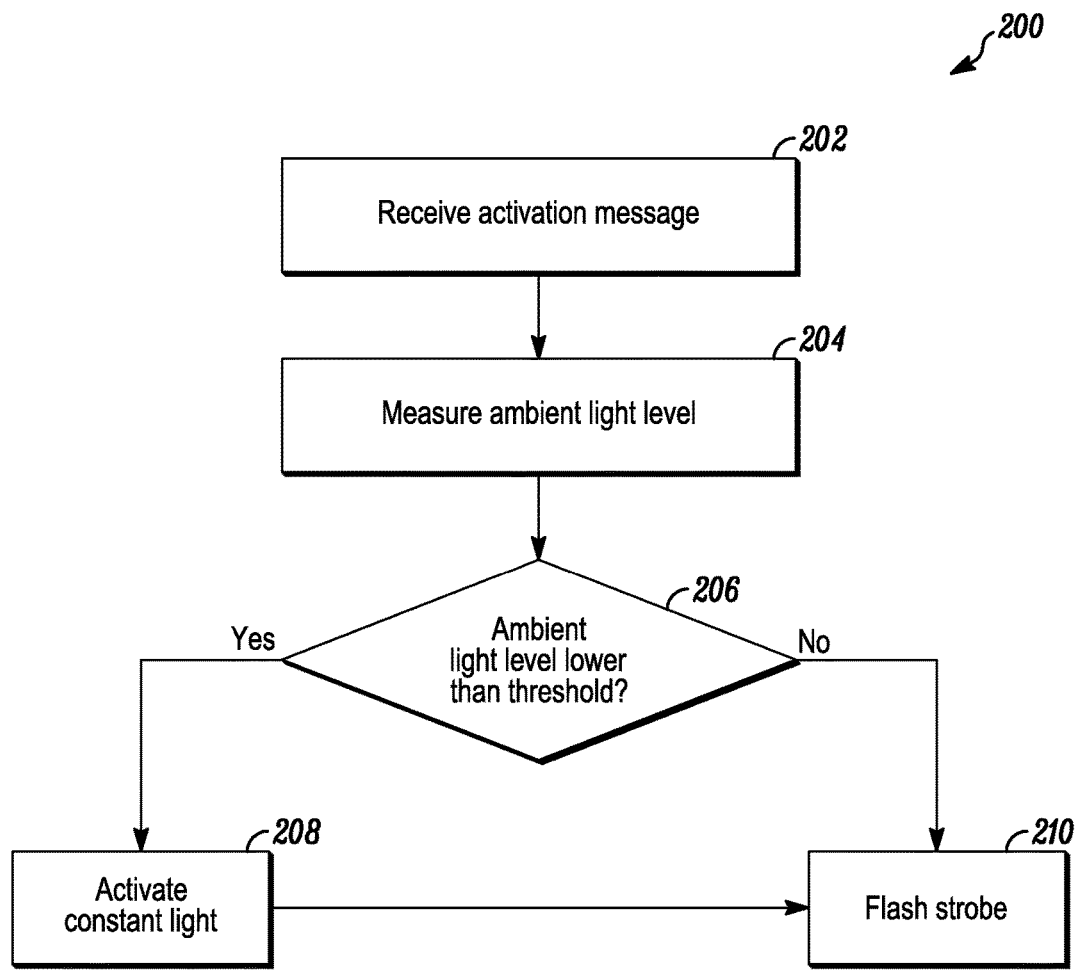
FIG. 2 is a flow diagram of a method in accordance with disclosed embodiments.

FIG. 2 is a flow diagram of a method 200 for reducing a risk of flicker vertigo caused by a notification appliance in accordance with disclosed embodiments. As seen in FIG. 2, the method 200 can include a processor (e.g. the programmable processor 32a) of a notification appliance (e.g. the notification appliance 22) receiving an activation message from a control panel (e.g. the control panel 18) as in 202. For example, the activation message can identify an alarm situation (e.g. a sensor detected a threat) or a test situation (no sensor detect a threat), and responsive to the activation message, the notification appliance can be activated. Responsive to, after, or separately from receiving the activation message, the method 200 can include the processor measuring an ambient light level as in 204. For example, the processor may measure the ambient light level by obtaining a signal indicative of the ambient light level from an ambient light sensor (e.g. the ambient light sensor 35).

Furthermore, the method 200 can include the processor determining whether the ambient light level is lower than a threshold as in 206. For example, the processor may retrieve the threshold from a computer-readable memory device of the notification appliance. When the processor determines that the ambient light level is lower than the threshold as in 206, the method 200 can include the processor activating a constant light source (e.g. the constant light source 26) to illuminate an area surrounding the notification appliance as in 208 and subsequently activating a flashing light source (e.g. the flashing light source 38 as is 210. In some embodiments, the processor can verify that the ambient light level is above the threshold before activating the flashing light source and refrain from activating the flashing light source until the ambient light level is above the threshold, for example, by continuing to increase the ambient light level.

However, when the processor determines that the ambient light level is above the threshold as in 206, the method 200 can include the processor activating the flashing light source as in 210 without any activation of the constant light source. Alternatively, in some embodiments, the processor can always activate the constant light source before activating the flashing light source.

The systems and methods disclosed herein improve on known systems and methods by providing a constant light source in a low ambient light condition to reduce a risk of flicker vertigo caused by a notification appliance where the constant light source can also provide light to occupants of a secured area during an evacuation therefrom, thereby making egress from the secured area safe for the occupants.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
    responsive to an alarm condition, a notification appliance measuring an ambient light level;
    the notification appliance determining whether the ambient light level is lower than a threshold;
    responsive to determining that the ambient light level is lower than the threshold, the notification appliance activating a constant light source; and
    the notification appliance activating a flashing light source after activating the constant light source.

2. The method of claim 1 further comprising the notification appliance measuring the ambient light level responsive to receiving an activation message from a control panel, wherein the activation message is indicative of the alarm condition.

3. The method of claim 2 further comprising the notification appliance receiving the activation message from the control panel responsive to a sensor detecting a threat within a secured area.

4. The method of claim 1 further comprising the notification appliance measuring the ambient light level responsive to receiving a test indicating signal from a control panel.

5. The method of claim 1 further comprising the notification appliance re-measuring the ambient light level after activating the constant light source.

6. The method of claim 5 further comprising the notification appliance determining that the ambient light level is higher than the threshold before activating the flashing light source.

7. The method of claim 5 further comprising the notification appliance refraining from activating the flashing light source when the notification appliance determines that the ambient light level is lower than the threshold.

8. The method of claim 1 wherein the constant light source includes an LED.

9. The method of claim 1 wherein the constant light source is located within the notification appliance.

10. The method of claim 1 wherein the constant light source is integrated into a mounting plate on which the notification appliance is mounted.

11. A system comprising:
    an ambient light sensor that measures an ambient light level responsive to an alarm condition;
    a programmable processor;
    executable control software stored on a non-transitory computer readable medium;
    a constant light source; and
    a flashing light source,
    wherein the programmable processor and the executable control software determine whether the ambient light level is lower than a threshold,
    wherein, responsive to determining that the ambient light level is lower than the threshold, the programmable processor and the executable control software activate the constant light source, and
    wherein the programmable processor and the executable control software activate the flashing light source after activating the constant light source.

12. The system of claim 11 wherein the programmable processor and the executable control software determine whether the ambient light level is lower than the threshold responsive to receiving an activation message from a control panel, and wherein the activation message is indicative of the alarm condition.

13. The system of claim 12 wherein the programmable processor and the executable control software receive the activation message from the control panel responsive to another sensor detecting a threat within a secured area.

14. The system of claim 11 wherein the programmable processor and the executable control software determine whether the ambient light level is lower than the threshold responsive to receiving a test indicating signal from a control panel.

15. The system of claim 11 wherein the programmable processor and the executable control software instruct the ambient light sensor re-measure the ambient light level after activating the constant light source.

16. The system of claim 15 wherein the programmable processor and the executable control software determine that the ambient light level is higher than the threshold before activating the flashing light source.

17. The system of claim 15 wherein the programmable processor and the executable control software refrain from activating the flashing light source when the programmable processor and the executable control software determine that the ambient light level is lower than the threshold.

18. The system of claim 11 wherein the constant light source includes an LED.

19. The system of claim 11 further comprising:
a housing,
   wherein the constant light source is located within the housing.

20. The system of claim 11 further comprising:
a mounting plate,
   wherein the constant light source is integrated into the mounting plate.

* * * * *